(12) United States Patent
Ruf et al.

(10) Patent No.: US 10,967,473 B2
(45) Date of Patent: Apr. 6, 2021

(54) SPINDLE NOSE WITH MEASURING FUNCTION

(71) Applicant: PRO-MICRON GMBH, Kaufbeuren (DE)

(72) Inventors: Daniel Ruf, Kaufbeuren (DE); Rainer Wunderlich, Kaufbeuren (DE)

(73) Assignee: pro-micron GmbH, Kaufbeuren (DE)

( * ) Notice: Subject to any disclaimer, the term of this patent is extended or adjusted under 35 U.S.C. 154(b) by 0 days.

(21) Appl. No.: 16/484,410

(22) PCT Filed: Jan. 12, 2018

(86) PCT No.: PCT/EP2018/050792
§ 371 (c)(1),
(2) Date: Aug. 7, 2019

(87) PCT Pub. No.: WO2018/145856
PCT Pub. Date: Aug. 16, 2018

(65) Prior Publication Data
US 2020/0001419 A1  Jan. 2, 2020

(30) Foreign Application Priority Data
Feb. 13, 2017  (EP) .................................. 17155924

(51) Int. Cl.
*B23Q 17/00* (2006.01)
*B23Q 17/09* (2006.01)
*B23B 31/26* (2006.01)

(52) U.S. Cl.
CPC ....... *B23Q 17/005* (2013.01); *B23Q 17/0966* (2013.01); *B23B 31/261* (2013.01); *Y10T 279/21* (2015.01)

(58) Field of Classification Search
CPC .. B23Q 17/005; B23Q 17/0966; Y10T 279/21
See application file for complete search history.

(56) References Cited

U.S. PATENT DOCUMENTS

| 7,878,070 B2 * | 2/2011 | Weller .................. B23B 31/207 73/760 |
| 9,314,891 B2 * | 4/2016 | Veittinger .......... B23Q 17/0966 |

(Continued)

FOREIGN PATENT DOCUMENTS

| DE | 9014037 | 12/1990 |
| DE | 10351347 | 7/2004 |

(Continued)

*Primary Examiner* — Erica A. Gates
(74) *Attorney, Agent, or Firm* — Sand, Sebolt & Wernow Co., LPA

(57) ABSTRACT

A spindle nose for a machine tool spindle. The spindle nose has a longitudinal axis and a receiving end at which a conical receiving area opens. The receiving area tapers conically away from the receiving end in the direction of the longitudinal axis for receiving a tool shaft cone. A circumferential wall surrounds the receiving area and forms a circumferential contact edge. The contact edge has flat contact surfaces on which contact surfaces of the tool shaft cone rest when the tool is clamped in the tool spindle. The spindle nose defines blind receiving bores leading perpendicularly to the flat contact surfaces and which end below the flat contact surfaces. The contact edge is divided into at least four segments with the same angle. At least one receiving bore is formed in each of the segments. A sensor is arranged in each receiving bore.

16 Claims, 3 Drawing Sheets

(56) References Cited

U.S. PATENT DOCUMENTS

| | | | | |
|---|---|---|---|---|
| 9,518,876 B2* | 12/2016 | Wulff | ............... | B23Q 17/005 |
| 10,259,090 B2* | 4/2019 | Van Sprang | ......... | B23Q 17/005 |
| 2007/0063620 A1* | 3/2007 | Kluft | .................. | B23Q 17/22 |

FOREIGN PATENT DOCUMENTS

| | | |
|---|---|---|
| EP | 1764186 | 3/2007 |
| EP | 1889685 | 2/2008 |
| EP | 2103379 | 9/2009 |
| EP | 2156924 | 2/2010 |
| EP | 2759369 | 7/2014 |
| EP | 2829859 | 1/2015 |
| EP | 2924526 | 2/2015 |
| JP | 2000079537 | 3/2000 |

* cited by examiner

SPINDLE NOSE WITH MEASURING FUNCTION

TECHNICAL FIELD

The invention relates to a spindle nose for a tool spindle of a machine tool where the spindle nose has a longitudinal axis and a receiving end at which a conical receiving area opens that tapers conically away from the receiving end in the direction of the longitudinal axis for receiving a tool shaft cone, wherein the conical receiving area is surrounded by a circumferential wall which forms a circumferential contact edge at the receiving end, wherein the contact edge has flat contact surfaces on which contact surfaces of the tool shaft cone rest when the tool is clamped in the tool spindle. It furthermore relates to a tool spindle with such a spindle nose.

BACKGROUND

Background Information

In material processing and in workpiece production, the requirements regarding precision and dimensional accuracy of the processing steps executed in the machine tool continue to increase; ever tighter tolerances are demanded. Additionally, there continues to be great demand for an increasing automatization of the operation of machine tools, a further reduction of the necessity for intervention by a machine operator, and, correspondingly, the comprehensive monitoring of the working processes of the machine tool.

In this context, it is known in the art to monitor the responses of tools received in the tool spindle to exerted forces and/or bending torques in real time using sensor elements analyzed via measurement technology during the machining process. For this purpose, strain sensors attached to the exterior surface of a tool holder are used, for example, as shown and described in DE 9014037 U1. A comparable procedure is shown in EP 2103379 A1. There, an adapter is disclosed, which is inserted into the tool spindle of a machine tool and fixed into position in the same, and which in turn receives a tool. This adapter is provided with strain sensing elements which wirelessly transmit the measured values to a receiving device arranged on the stator. The measurement devices shown in the two aforementioned publications are intended to detect critical forces and/or torques in order to determine, for example, when the tool being used shows a certain level of wear and must be replaced in order to maintain machining quality.

Another use of measurement sensors arranged in tool spindles is described and disclosed in EP 1889685 B1. Here, appropriate sensors are used to detect—specifically in tool spindles at a standstill—whether a foreign particle, particularly a chip, is present in the tool holder of the tool spindle, which would lead to an inaccurate positioning of the tool inserted into the tool spindle and locked within the same. This is done because such alignment errors, which for example can be caused by chips which are introduced into the area of the tool spindle during a tool change, can lead to an inaccurate alignment of, for example, the cutting process of the tool, which in turn can lead to deviations in the machining result, up to a complete rejection of the workpieces machined or produced with the machine tool.

Although the options and solutions shown in the prior art generally have proven to be successful, they each only cover the detection of respective specific values and parameters; specifically, they are only able to either detect the presence of a foreign particle in the tool holder of the tool spindle or detect deviations regarding forces or bending torques which for example might indicate the wear of the tool and thus the need for a tool change. In this context, one aspect that particularly must be considered to be disadvantageous is that, according to the method for measuring forces and torques known from EP 2103379 A1, a space-consuming adapter must be inserted between the tool spindle and the actual tool. For one, not every machine tool offers sufficient installation space to add such an adapter. Secondly, such an inserted adapter leads to potentially greater inaccuracy regarding the correct and exact position of the tool, as the manufacturing tolerance of the adapter is added to the potential dimensional deviations of the tool spindle itself, which must be manufactured with the highest precision, such that higher tolerance deviations may result. Furthermore, this method only allows for the monitoring of those processes in which a tool holder equipped with sensors was placed into the motor spindle. Therefore, in order to fully monitor all machining processes, all tool holders must be equipped with the appropriate sensors, which would result in extensive efforts and great costs.

SUMMARY

Based on the known prior art and considering the problems described above, the object of the present invention is to improve the sensor systems of a tool spindle such that it can be used to automatically monitor a greater number of parameters and/or states, in particular for all processes which can be executed with this tool spindle, without needing to introduce an adapter. In particular, it should be possible to use the sensor system both to monitor the correct position of a replaced tool and to record the transverse forces and/or bending torques exerted onto the tool during the machining process. Advantageously, the sensor system is intended to be integrated in the spindle nose, that is, in that partial element of the tool spindle which is arranged on the front of the rotor of the tool spindle, facing the tool.

According to the invention, this object is solved by a spindle nose of a tool spindle of a machine tool where the spindle nose has a longitudinal axis and a receiving end at which a conical receiving area opens that tapers conically away from the receiving end in the direction of the longitudinal axis for receiving a tool shaft cone, wherein the conical receiving area is surrounded by a circumferential wall which forms a circumferential contact edge at the receiving end, wherein the contact edge has flat contact surfaces on which contact surfaces of the tool shaft cone rest when the tool is clamped in the tool spindle; and where the spindle defines receiving bores in the form of blind bores which lead perpendicularly to the flat contact surfaces and which end below the flat contact surfaces are formed in the wall, wherein the contact edge is divided into at least four segments with the same angle, and at least one receiving bore is formed in each of the segments such that two receiving bores formed in the aforementioned manner lie diametrically opposite each other in each segment, wherein a sensor is arranged in each of these receiving bores which is sensitive to the forces and/or deformations in the direction of the extension of the receiving bore, and which changes a value of a measurement, in particular its electrical resistance, on the basis of such forces and/or deformations, wherein an analyzing device is provided in which the sensors, in particular the respective sensors lying diametrically opposite from each other, make a contribution with different mathematical signs in the event of a force or deformation acting in the direction of the longitudinal axis. Advantageous developments of such a spindle nose include that pairs of respective receiving bores lie diametrically opposite of each other, and in that at least two sensors arranged in first segments adjacent to each other make a contribution with a first mathematical sign, + or −, wherein at least two sensors arranged in second segments different from the first segments and lying adjacent to each other make a contribution with a second mathematical sign, − or +, opposite from the first mathematical sign. The contact edge of the spindle nose is divided into at least eight segments with the same angle, and at least one receiving bore is formed in each of the segments such that two receiving bores formed in the aforementioned manner lie diametrically opposite each other in pairs in each segment, wherein a sensor is arranged in each of these receiving bores which is sensitive to the forces and/or deformations in the direction of the extension of the receiving bore, and which changes its electrical resistance on the basis of such forces and/or deformations, wherein an analyzing device is provided in which four of the sensors four respective sensors are electrically or logically connected together to a full bridge circuit such that sensors arranged in two respective receiving bores which lie diametrically opposite to each other in pairs of adjacent segments are connected in the parallel loops of the full bridge circuit in such a manner that, in a first loop of the full bridge circuit, a first sensor arranged in a first receiving bore and a third sensor arranged in a third receiving bore lying in a segment adjacent to the segment in which a second sensor received in a second receiving bore, which lies diametrically opposite from the first receiving bore, is arranged, are connected in series, and in that in a second loop of the full bridge circuit, parallel to the first sensor, a fourth sensor arranged in a fourth receiving bore lying diametrically opposite from the first receiving bore is connected in series with the second sensor. In the spindle nose, the receiving bores may extend in the direction of the longitudinal axis. The receiving bores may be arranged in such a manner that their central axes intersect with a circumferential line of a circle concentric with the center longitudinal axis of the spindle nose. The center axes of the receiving bores intersects the circumferential line at identical angular distances between the center axes of adjacent receiving bores. In the spindle nose, the sensors are of an identical type. The sensors are cylinder-shaped strain sensors, which detect deformations in their axial direction. In addition to the receiving bores, additional blind bores are positioned perpendicular to the flat contact surfaces, which reach the flat contact surfaces from the side opposite to the receiving end, wherein additional sensing elements are arranged in said additional blind bores, wherein these sensing elements are connected independently from the sensors to capture additional measurements. The spindle nose may further include transmitting means for wirelessly transmitting measurement data captured by the sensors and by applicable additionally arranged sensing elements to a receiving unit arranged outside of the spindle nose. The spindle nose further includes an energy supply module for supplying the sensors and for applicable additional electric components arranged on the spindle nose via energy received in a wireless manner. The energy storage device arranged on the spindle nose may store electrical energy. In the spindle device, the receiving bores end 3-15 mm below the flat contact surfaces Another aspect of a solution is represented by a tool spindle for a machine tool having a stator and a rotor, and which includes a spindle nose designed according to the invention and arranged on a front end of the rotor.

According to the invention, the spindle nose for a tool spindle of a machine tool has a longitudinal axis and a receiving end. At the receiving end, a conical receiving area opens that tapers conically away from the receiving end in the direction of the longitudinal axis for receiving a tool shaft cone. Said conical receiving area is surrounded by a circumferential wall which forms a circumferential, in particular circular circumferential, contact edge at the receiving end. The contact edge has flat contact surfaces on which contact surfaces of the tool shaft cone rest when the tool is clamped in the tool spindle. To that extent, the characteristics of the spindle nose correspond to the prior art and the spindle noses known and defined in the same. The spindle nose according to the invention is characterized in that receiving bores in the form of blind bores which lead perpendicularly to the flat contact surfaces and which end below the flat contact surfaces are formed in the wall surrounding the receiving area, wherein the contact edge is divided into at least four segments with the same angle, and at least one receiving bore is formed in each of the segments. The division of the contact edge into the at least eight segments with the same angle does not have to be prescribed in a visible manner by particular structures or elements; the segments can also be conceived as virtual segments that can be placed on top of the receiving edge as a kind of grid without physically forming these segments directly on the contact edge.

If furthermore is essential to the invention that two respective receiving bores formed in the aforementioned manner lie diametrically opposite each other in each segment, which can be implemented in a paired allocation, in particular if the sensors are analyzed in a full bridge circuit. In other words, there are at least two pairs of receiving bores, wherein, for each pair, two receiving bores summed in this manner are opposite from each other along a diameter of the circular contact edge. Furthermore, a sensor is arranged in each of these receiving bores which is sensitive to the forces and/or deformations in the direction of the extension of the receiving bore, and which changes a value of a measurement, in particular its electrical resistance, on the basis of such forces and/or deformations. Additionally, an analyzing device is provided, which, for example, could consist of a logic circuit integrated into the spindle nose or a processor-controlled computer arranged in the same, which in principle could also be provided outside of the spindle nose and which can receive the signals of the sensors, in particular receive the same wirelessly, and process the same, and in which the sensors can be analyzed in such a manner that the sensors make a contribution of the measurement with different mathematical signs in the event of a force or deformation acting in the direction of the longitudinal axis. Therein, in particular at least two sensors arranged in first segments lying opposite from each other could make a contribution with a first mathematical sign, + or −, wherein at least two sensors arranged in second segments different from the first segments (I, II, V, VI) and lying opposite from each other make a contribution with a second mathematical sign, − or +, opposite from the first mathematical sign.

In this context, at least two sensors arranged in first segments adjacent to each other in particular could make a contribution with a first mathematical sign, + or −, wherein at least two sensors arranged in second segments different from the first segments and lying adjacent to each other make a contribution with a second mathematical sign, − or +, opposite from the first mathematical sign.

Using a specific circuit, as described above, in particular in its possible design variants, it is then possible on the one hand to detect bending torques caused by the occurrence of forces transverse to the longitudinal direction, which also means transverse to a longitudinal axis of the tool, during dynamic operation, that is, while the tool spindle and, correspondingly, the spindle nose, are rotating, resulting in the ability to dynamically monitor the tool responses during the machining process of a workpiece using a machine tool equipped with a tool spindle having a spindle nose according to the invention. Thus, the breaking or wear of a tool can be detected by, for example, analyzing the occurring bending torques in comparison with, for example, a long-term response, thus triggering the replacement of said tool. Thereby, the rejection of workpieces not meeting the requirements is avoided. A bending torque of course can also be detected when the tool spindle is at a standstill, for example, as a result of collisions of workpiece and tool.

Such an analysis of the bending torques captured with the spindle nose according to the invention could be performed using the procedure described in EP 2924526 A1, for example.

Furthermore, the specific sensor circuitry described above, if appropriately analyzed for time sequence (namely, for the temporal relationship with a clamping procedure of a tool), can also make it possible to capture the deviation in the contact pressure resulting from the contact of the contact surfaces of the tool shaft cone with the flat contact surface, in particular of an asymmetry typically developing in this context, said deviation being caused by a foreign particle, such as a chip, in the area of the tool holder of the spindle nose or of the tool spindle equipped with such a driver. Such an analysis can specifically, but not exclusively, be performed when the tool is at a standstill, that is, when the tool spindle is not rotating. This is due to the fact that an uneven pressure load on the sensors arranged in the various segments also is detected by the analysis described above in the form of a measurement deviating from "null" when the sensor signals are summed. This analysis makes it possible to detect a peak, that is, a deviation of the summed signal outside of a tolerance limit and, if said deviation occurs temporally following a clamping procedure of a tool, to detect an "incorrectly clamped tool" event or a "chip in the tool spindle" event.

By arranging the sensors in the receiving bores formed as blind bores which end below the flat contact surfaces, the measurement technology according to the invention is integrated in the spindle nose, which in any case is a part of the tool spindle, such that no additional adapter needs to be attached, no additional installation space is required and no loss in dimensional accuracy of the tool clamping occurs. In particular, existing spindle noses of existing tool spindles can be retrofitted with a sensor system working according to the principle according to the invention through appropriate modifications, or existing spindle noses of tool spindles can be replaced by spindle noses designed according to the invention, such that the various measuring and monitoring functions, which are made possible within one system for the first time by the present invention, can be integrated into existing machine tools with existing tool spindles and spindle noses. The particular arrangement of the sensors in the blind bores results in a particularly sensitive sensor system, as they are positioned very close to and directly on the tool subjected to forces and/or bending torques to capture measurements there.

It must be emphasized at this point that the invention is not limited to the arrangement of four sensors in receiving bores distributed across four segments. Instead, it is also possible, for example, to arrange six, eight or more, for example 12, 16 or even more, sensors in receiving bores distributed across segments divided in a corresponding manner, and to analyze the same in the corresponding linked analysis.

The sensors to be considered for this in particular include strain measurement sensors variable in their electric resistance, specifically those in a cylinder shape. However, sensors working according to other measurement principles also can be used, such as SAW components or also capacitive strain measurement sensors.

This analysis in particular can be performed using bridge circuits in which the sensors are combined such that the requirement for mathematical signs as described above is met. Conceivable electric circuits include half bridge or full bridge circuits. When connecting the sensors into a half bridge circuit to implement the invention, two sensors arranged in segments opposite from each other are connected into such a half bridge circuit. Such bridge circuits hold an advantage over principally conceivable digital circuits (e.g., "virtual bridge circuits") in that they are not sensitive to potential line resistance and, consequently, to the errors introduced by the same when combining the sensor information.

In one possible and currently preferred development of the invention, the contact edge is divided into at least eight segments with the same angle and at least one receiving bore is formed in each of the segments such that two respective receiving bores formed in this manner lie diametrically opposed to each other in pairs. A sensor, which is sensitive to forces and/or deformations occurring in the direction of the extension of the receiving bore and an electric measurement output of which, in particular the electric resistance of which, changes on the basis of such forces and/or deformations, is arranged in each of the receiving bores. In the analysis, four respective sensors are analyzed connected together in a full bridge in such a manner that sensors arranged in two respective receiving bores which lie diametrically opposite to each other in pairs of adjacent segments are connected in the parallel loops of the full bridge circuit. In other words, a full bridge circuit, for example and specifically, a Wheatstone bridge, is formed from two sensors arranged in receiving bores in adjacent segments and from sensors that are arranged in receiving bores which respectively lie diametrically opposite to these receiving bores. According to the invention, the connection of the sensors in the parallel loops of the full bridge circuit is performed as follows:

In a first loop of the full bridge circuit, a first sensor arranged in a first receiving bore and a third sensor arranged in a third receiving bore lying in a segment adjacent to the segment in which a second sensor received in a second receiving bore, which lies diametrically opposite from the first receiving bore, is arranged, are connected in series. In a second loop of the full bridge circuit, parallel to the first sensor, a fourth sensor arranged in a fourth receiving bore lying diametrically opposite from the first receiving bore is connected in series with the second sensor, wherein the second sensor is then arranged in parallel to the third sensor in the full bridge circuit.

This way, two full bridge circuits are created in an arrangement of eight sensors in eight receiving bores, which result in four adjacent segments using the circuitry described above, in which a deformation in an axial direction, for example a compression, of the sensors results in a change in voltage of the bridge circuit with a negative mathematical sign, whereas the other four adjacent segments cause a change in voltage of the bridge circuit with a positive mathematical sign for a deformation in the same axial direction, that is, a compression.

In particular, the receiving bores may extend in a longitudinal direction in the spindle nose according to the invention, namely if, as typically is the case, the flat contact surfaces extend perpendicularly to the longitudinal direction of the spindle nose. It must be emphasized at this point that the term "flat contact surfaces" does not have to imply a physical separation between the individual flat contact surfaces, as is the case in many spindle noses in which separately formed flat contact surfaces are present along the circumference of the contact edge, said flat contact surfaces being interrupted by other structures. Even a flat contact surface formed continuously across the entire contact edge forms flat contact surfaces in the sense of the invention, wherein these then are sections of the continuous flat contact surface arranged in the various segments.

In particular and advantageously, the receiving bores are positioned in the spindle bore according to the invention in such a manner that their central axes intersect with a shared circumferential line of a circle concentric with the center longitudinal axis of the spindle nose (said circle lying on a plane perpendicular to the center longitudinal axis). This way, a symmetric arrangement of the sensors about the center longitudinal axis of the spindle nose is achieved, which is advantageous for the analysis of the sensors by the bridge circuits. Furthermore—and this also is particularly advantageous—the receiving bores can be arranged such that the center axes of adjacent receiving bores intersect the aforementioned circumferential line at identical angular distances. This particular arrangement also leads to an increased symmetry, which is particularly advantageous for the analysis of the measurements detected by the sensors.

It also is advantageous, for reasons related to symmetry, which leads to a good practicability and high sensitivity of the measurement sensor system formed by the sensors, if the sensors are of identical types. Thus, it is advantageous if the sensors are of identical design and identical sensitivity, such that, ideally, the measurements by the sensors in a bridge circuit under a balanced axial load do not result in an imbalance of the bridge, that is, result in a bridge signal of "0".

Advantageously, the sensors are cylinder-shaped strain sensors, which detect deformations in their axial direction, or an impact of a force in this direction. In particular, the cylinder-shaped strain sensors should be dimensioned in their cylinder diameter such that they are inserted into the receiving bores with an exact fit (or, correspondingly, the receiving bores are to be designed such that their diameter corresponds to the diameter of the cylinder-shaped strain sensors), such that the sensors can be fixed into an exact position in the receiving bores by simple means.

It also is within the scope of the invention that the spindle nose has sensing elements in addition to the sensors arranged in the receiving bores, said elements being arranged in blind bores which are positioned perpendicular to the flat contact surfaces and which reach the flat contact surfaces from the side opposite to the receiving end, wherein said elements serve to capture additional measurements independently from the sensors and said elements are connected accordingly. Such additional sensing elements, if connected appropriately, can, for example, be used to detect axial forces acting upon the tool, such that these parameters can also be captured during the operation of the machine tool having the spindle nose according to the invention, and can be used to detect any wear of the tool.

In order to be able to analyze the data captured by the spindle nose it is advantageous if transmitting means for wirelessly transmitting measurement data captured by the sensors and by any additionally arranged sensing elements to a receiving unit arranged outside of the spindle nose are arranged on the spindle nose. Such a wireless transmission is significantly preferable to a wire-based transmission, which then would be transferred from the rotating element of the tool spindle to the stator via a rotating connector. Such a telemetric data transmission can, for example, be performed via RFID technology or similar technology.

The energy supply for the sensors arranged on the spindle nose and for applicable additional electric components provided on the same also can be performed advantageously in a wireless manner, for example via induction. Alternatively or additionally, an energy storage device can be provided on the spindle nose, which supplies the spindle nose and any other electric components with electrical energy. Such an energy storage device could be a rechargeable battery or a non-rechargeable battery or also a capacitor or similar device.

In particular, care should be taken in the design of the spindle nose not to create unbalances through the arrangement of the sensors and other elements and through the introduction of receiving bores and any other blind bores, as such unbalances could be detrimental to the radial runout of the spindle nose at high rotational speeds of the tool spindle.

In order for the sensors to be able to capture the pressures acting upon the flat contact surfaces, said pressures being captured by the sensors by detecting the corresponding forces and/or deformations with high accuracy, the receiving bores for receiving the sensors, which are designed as blind bores, must be routed to closely approach the flat contact surfaces from below. To this end, the respective sensor, that is, the blind bore, must be routed as closely as possible to the flat contact surface from the rear. On the other hand, the blind bores must not interfere with the stability and the exact alignment of the flat contact surfaces. The flat contact surface in particular must remain mechanically stable under the harsh operational conditions. Accordingly, the expected operational conditions must be considered in the design, as is the geometry of the spindle nose, in particular in the area of the flat contact surfaces. For example, the receiving bores can end 3-15 mm below the flat contact surfaces.

Finally, it must be mentioned that the aforementioned connection into full bridge circuits can be executed as a hardwire connection, but that it is also possible to establish a switchable connection, such that the sensors can not only be connected into full bridges, for example, but also into half or quarter bridges, or that bridge circuits with a different linkage of the sensors can be achieved, for example in order to capture and analyze other values with the sensors, for example any occurring axial forces.

BRIEF DESCRIPTION OF THE SEVERAL VIEWS OF THE DRAWINGS

Other advantages and characteristics of the invention arise from the following description of exemplary embodiments based on the attached drawings. The drawings show.

DETAILED DESCRIPTION

In the initial drawings, a possible exemplary embodiment of the spindle nose according to the invention is shown schematically and in various views; the spindle nose according to the invention generally is labelled with the reference number 1. However, this representation does not claim to be complete with regards to all characteristics of this spindle nose 1, but merely is to be understood to be an illustration to clarify the characteristics essential to the invention as well as other particularly advantageous characteristics of the same.

Other drawings illustrate the full bridge circuits (FIG. 5) according to the invention, as well as the analysis of the sensor data for detecting an inappropriately clamped tool in a static state of the spindle nose 1 or, correspondingly, of the tool spindle equipped with the same.

Figure 1:
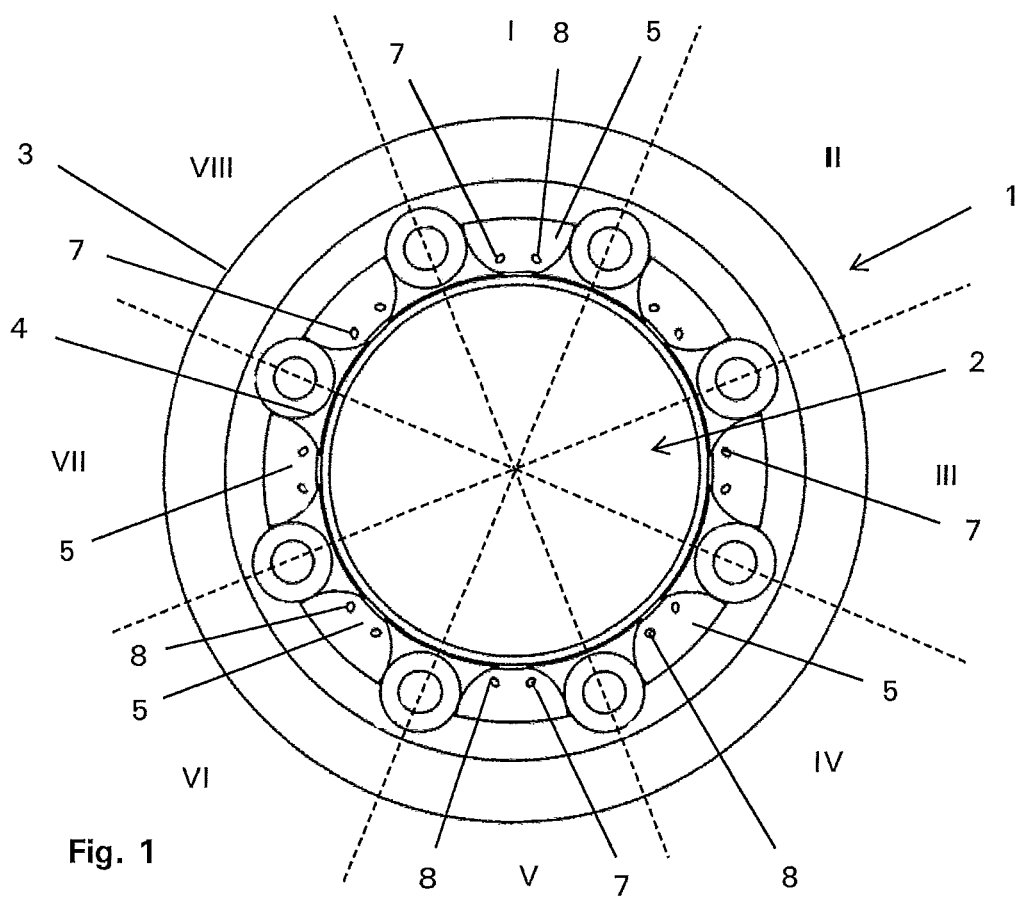
FIG. 1 A top view of a possible design of a spindle nose according to the invention from the receiving end, wherein positions of sensors and sensing elements arranged below the surface also are drawn in here.
Figure 2:
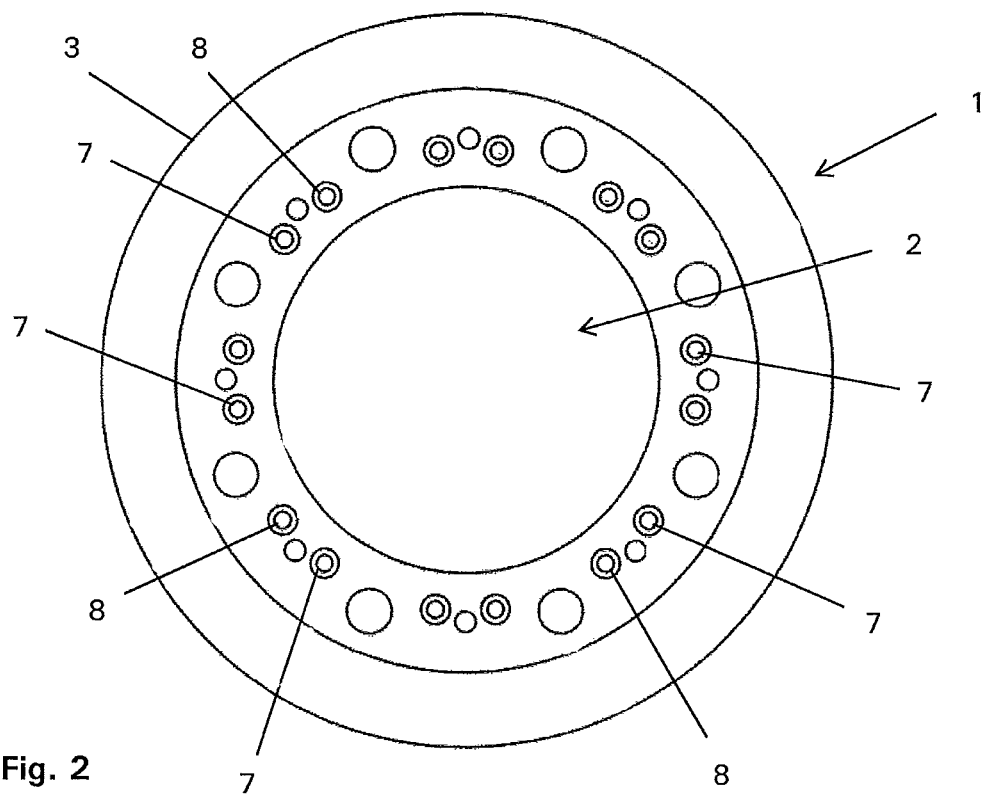
FIG. 2 A rearward view of the spindle nose from FIG. 1.
Figure 3:
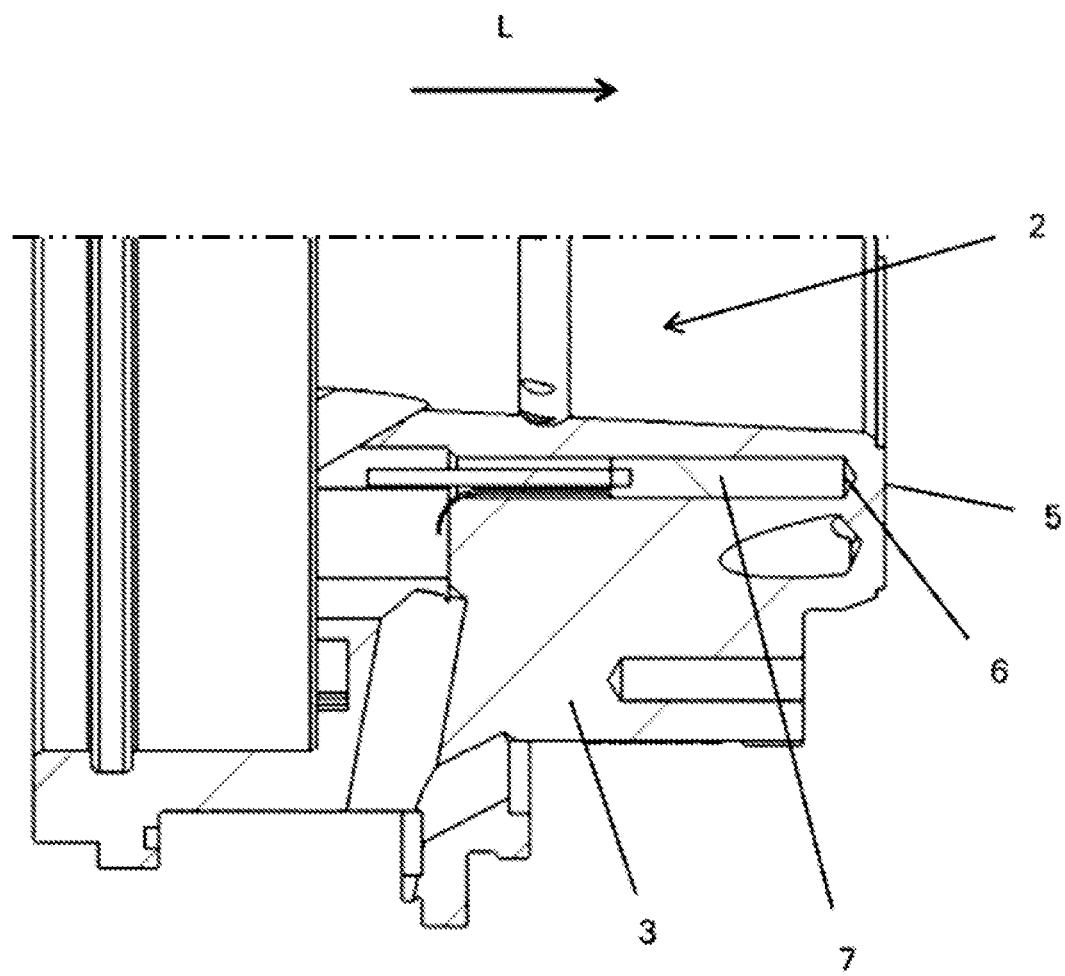
FIG. 3 A longitudinal sectional view taken along a radial line of a detail of the spindle nose from FIG. 1.
Figure 4:
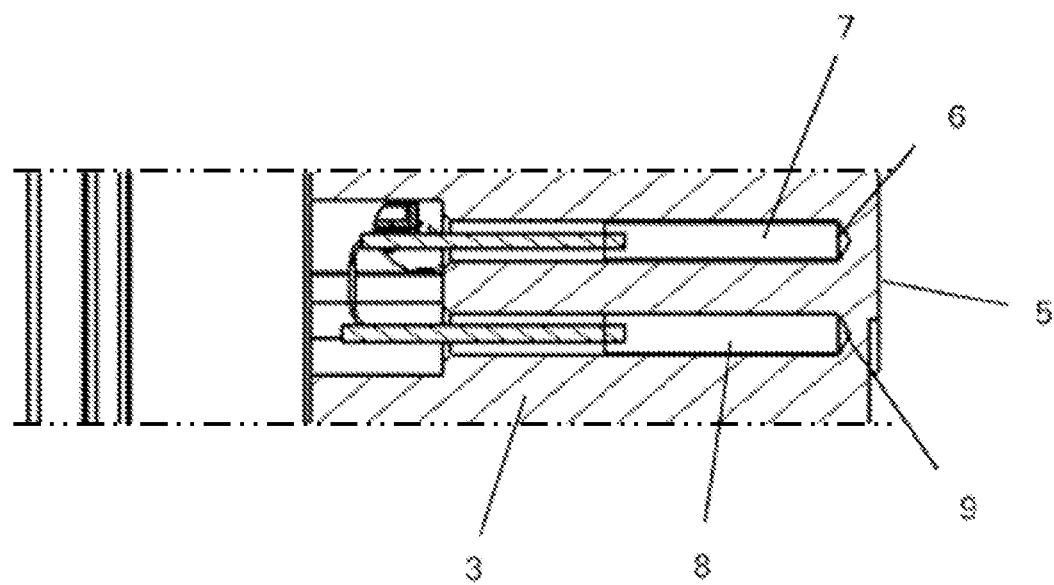
FIG. 4 A sectional view taken along an intersecting line of a detail of the spindle nose from FIG. 1.

To begin with, reference is made here to FIGS. 1 to 4, which are graphic representations in various views of a possible exemplary embodiment of a spindle nose 1 according to the invention. The spindle nose 1 generally is formed in a circular shape, with a conical receiving area 2 positioned in the center of the same and extending in a longitudinal direction L, that is, in the direction of the longitudinal axis (cf. FIG. 3). FIG. 1 shows a view of the spindle nose 1 from a front side, that is, from a receiving end; FIG. 2 shows a backside view. FIGS. 3 and 4 contain sectional view of details, wherein the receiving end of the spindle nose 1 is shown positioned on the right side in these drawings. It is particularly clear to see in FIG. 3 that the conical receiving area 2 tapers conically starting from the receiving end in the direction of the rearward end, as is common for respective tool holders in tool spindles or spindle noses.

The conical receiving area 2 is surrounded by a wall 3, which in the exemplary embodiment shown here follows a stepped outline. This wall 3 forms a circumferential contact edge 4 toward the receiving end, wherein flat contact surfaces 5 are formed on the same for making contact with corresponding contact surfaces, which typically are formed on the collar of a tool shaft for this purpose. The flat contact surfaces 5 are formed separately from each other in the exemplary embodiment shown here and are formed in a semi-circular shape. Herein, the design of the flat contact surfaces 5 is not limited to this form. A continuous flat contact surface 5 extending across the entire contact edge 4 also could be provided, for example. As indicated in FIG. 1, the contact edge 4 with the flat contact surfaces 5 can be divided into segments, in this case a total of eight segments, which are numbered consecutively with I to VIII in a clockwise direction in the drawing. In the exemplary embodiment shown here, one flat contact surface 5 lies in each of the eight segments I to VIII. The spindle nose 1 is characterized in that sensors 7 are arranged in receiving bores 6 (cf. FIG. 3 and FIG. 4) in the form of blind bores which lead perpendicularly to the flat contact surfaces 5, said sensors being able to capture forces acting upon the flat contact surfaces 5, that is, deformations of the material. These sensors 7 here are shaped in the form of a cylinder, are inserted into the receiving bores 6 with an exact fit and are fixed into position in the same. The receiving bores 6 therein are routed from the rear end lying opposite the receiving end (cf. view in FIG. 2) into the material of the wall 3 and end there at a distance of 3-15 mm, in particular 10-15 mm, in particular 12 mm, below the respective flat contact surface 5 to which they are allocated. The sensors 7 in particular may be formed from strain gauges. Herein, they are arranged such that their longitudinal axes lie in an imagined circle drawn in the plane of the flat contact surface 5, which is formed concentrically to the circumference of the spindle nose 1. Furthermore, pairs of respective receiving bores 6 lie diametrically opposite of each other.

According to one option of the invention, the exemplary embodiment shown here of a spindle nose 1 has sensing elements 8 in addition to the sensors 7, said elements being located in additional blind bores 9 which are routed in the same way from the rear end of the spindle nose 1 into the material of the wall 3, just as the receiving bores 6, and which also extend to a point below the respective flat contact surface 5 to which they are respectively allocated. These sensing elements 8, just as the sensors 7, also can be designed as cylinder-shaped sensing elements 8, which are arranged in the blind bores 9 with an exact fit. Here, too, strain gauges can be used to form the sensing elements 8. These additional sensing elements 8, connected in a circuit separate from the sensors 7, serve to detect further measured, values, as will be described in the following.

In particular, the sensors 7 are all similar, that is, of identical type and with the same sensitivity; the sensing elements 8 also may be the same type of component as the sensors 7.

Figure 5:
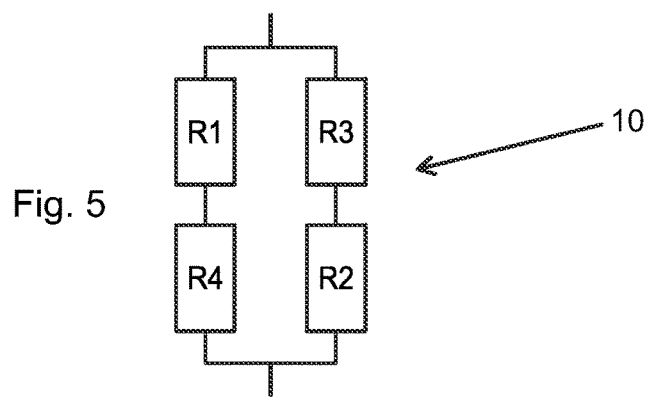
FIG. 5 A schematic representation of a full bridge circuit, into which the sensors of the spindle nose from FIG. 1 are connected for analyzing their signals.

Another characteristic of the spindle nose 1 according to the invention is that it can perform an analysis of the signals recorded with the sensors 7, which are based on changes in the respective electrical resistance of the sensors 7. For this, four respective sensors 7 are connected in a full bridge, or are connected in this manner for the analysis, specifically as shown in FIG. 5 with the full bridge circuit 10 represented there. The full bridge circuit 10 shown in FIG. 5 has two parallel bridge loops, as is common for such circuits. In a first bridge loop, a resistor R1 and another resistor R4 are connected in series; parallel to this, a resistor R3 and a resistor R2 are connected in series in the second bridge loop in an analogous connection sequence. In the spindle nose 1 according to the invention, the sensors 7 are to be equated as follows with the resistors R 1 to R4 shown in FIG. 5: in a first such bridge circuit, R1 represents the sensor 7 arranged in segment I. R2 is the sensor 7 arranged in segment II. R3 is the sensor 7 arranged in segment V, and R4 represents the sensor 7 arranged in segment VI.

In the second full bridge 10, the sensor 7 in segment VII is to be equated with the resistor R1; the sensor 7 in segment VIII forms the resistor R2. The resistor R3 in this full bridge, then, is formed by the sensor 7 arranged in segment III; finally, the sensor 7 in segment IV is the resistor R4 in the second full bridge.

The result of this special circuitry is that, when a force component is present which is perpendicular to the flat contract surface 5 and pointing in a direction away from the contact end, and which leads to a compression of the sensors 7, the sensors 7 in the segments I, II, VII and VIII make a contribution with a positive mathematical sign in the bridge combination and the sensors 7 in the segments III, IV, V and VI make a contribution with a negative mathematical sign.

This circuit design does not allow for an analysis regarding an axial force with an even load, as the respective contributions would cancel each other out, which means that no bridge imbalance would be detected. However, it does allow for the detection of transverse forces, that is, bending torques, occurring during working operations, in particular when the spindle nose 1 is rotating, but also when it is at a standstill, as said forces lead to an uneven distribution of the axial force components acting perpendicularly to the flat contact surfaces, that is, in the direction of a rotational axis of the spindle. Therefore, this sensor arrangement and circuitry also make it possible to capture respective transverse forces, that is, bending torques, which in turn can be used to determine tool wear or tool failure or another anomaly via commonly known procedures. In addition, this design makes it possible to generally detect uneven contact pressures, such as are created by an inaccurately clamped, in particular tilted, tool, such as may occur due to the presence of a foreign particle in the tool holder, for example of a chip that landed there. Thus, the spindle nose 1 according to the invention can be used to detect an incorrectly clamped tool subsequent to a clamping process of a tool, for example after a change in tools, both in a dynamic and in a static state.

Figure 6:
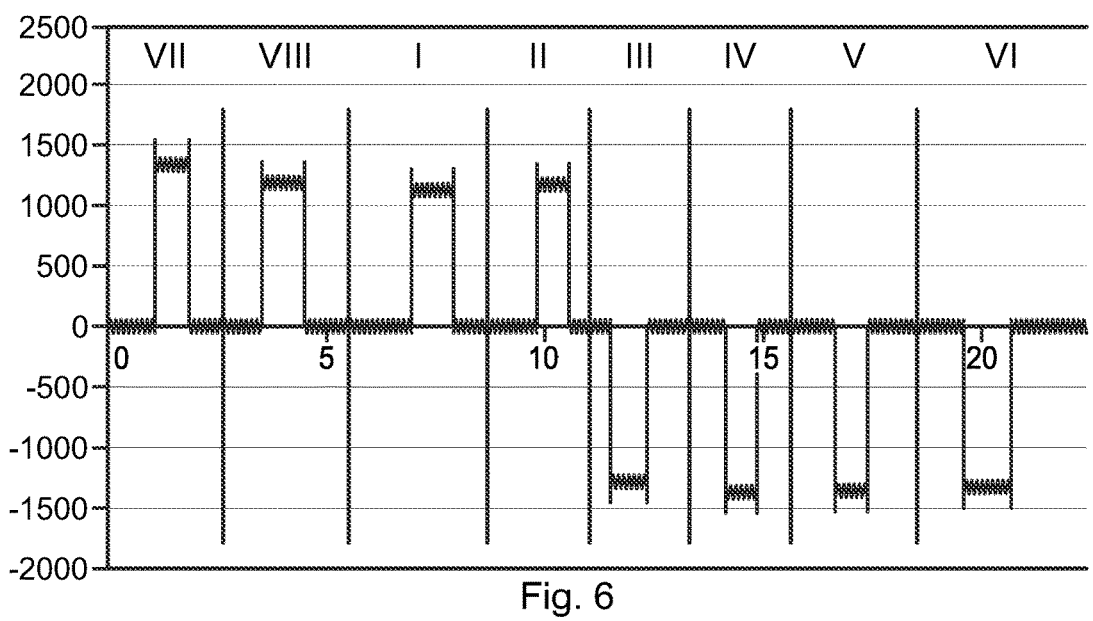
FIG. 6 A representation of the signals received from the sensors in the segments in the case of an inappropriately clamped tool, such as might occur due to the presence of a foreign particle, such as a chip, in the tool holder.
Figure 7:
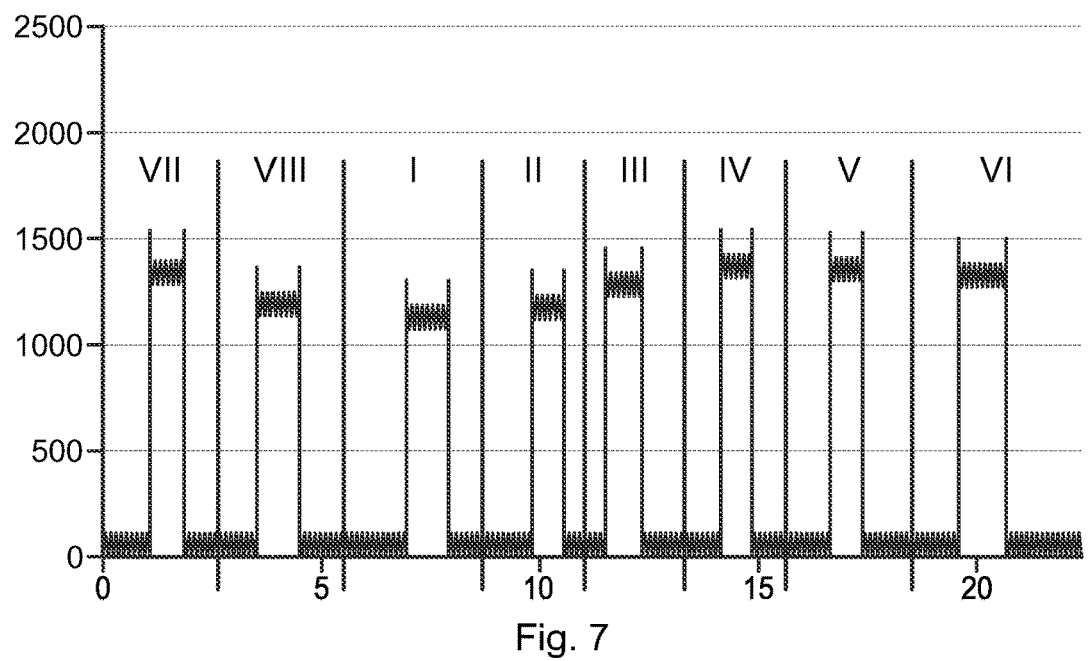
FIG. 7 A representation of the signals according to FIG. 6 according to their absolute amounts, in order to better clarify the differences between the sensor signals from different segments due to inappropriate clamping.

The process of deducing an incorrect clamping of a tool is illustrated in the drawings in FIGS. 6 and 7. Therein, measurements obtained with the sensors 7 arranged in the individual segments—said measurements having been recorded in an experimental setup with foreign particles knowingly introduced into the tool holder—are represented according to their resistance values, wherein the mathematical signs obtained by the circuitry according to the invention in the full bridge circuit 10 are considered in FIG. 6. FIG. 7 shows a representation of these measurements purely according to their absolute values, which makes it easy to see that these measurements assume different values which deviate from the identical values to be expected from the symmetrical arrangement of sensors 7 of identical types. This points toward an uneven load of the flat contact surface 5 due to an incorrectly clamped tool and is analyzed accordingly.

In order to also be able to draw conclusions regarding an (even) axial force in the exemplary embodiment shown here, additional sensing elements 8 are used. These are coupled with each other in a—principally known—circuitry such that (even) axial forces, for example, lead to an imbalance in a bridge circuit formed by the sensing elements 8, such that conclusions about such axial forces can be drawn. Through this additional equipment, the spindle nose 1 according to the invention also allows for the monitoring of this parameter in real time.

The results or data of this analysis, which for example can be performed by an on-chip computer arranged on the spindle nose 1, which is not shown in the drawings, are transmitted via a wirelessly operating telemetry module, for example, a RFID transponder—also not shown here—located on the spindle nose 1, to a receiver located in a fixed position opposite from the spindle nose 1, which in turn transfers them to a machine control system of the machine tool, for example, for further analysis and display. Thus, warning notifications could be generated in the machine control system based on these data, or actions could be triggered. If, for example, an incorrectly clamped tool is detected by the spindle nose 1 according to the invention and by the sensor system integrated therein, the machine control system could initiate an automated repeat of the tool change and the cleaning of the conical tool shaft and the tool holder with compressed air to remove any chips or other foreign particles that may be present there, before the tool is operated again. If the measurements continue to indicate incorrect clamping after such a procedure, an alert can be sent out so that a machine operator can inspect and correct the error.

Advantageously, the energy supply for the elements arranged on the spindle nose 1 according to the invention also is performed wirelessly, for example by generating an inductive voltage in a coil arranged on the spindle nose 1 via electromagnetic waves. Additionally or alternatively, a storage device for electrical energy can be arranged on the spindle nose 1, such as a non-rechargeable battery, a rechargeable battery, a capacitor or a similar device.

The exemplary embodiment described above shows one possible implementation of the invention, in which eight segments are provided, in which sensors are arranged in blind bores, which are connected into full bridge circuits. Other solutions also are conceivable. For example, fewer (or more) than eight segments can be provided and, instead of connecting four respective sensors into full bridge circuits, two respective sensors can be combined into a half bridge circuit and can be analyzed accordingly.

The description above of the exemplary embodiments again showed the significant usefulness of the spindle nose 1 according to the invention, as it makes it possible to monitor multiple operational parameters in both the static and dynamic state of the spindle nose 1, or, correspondingly, of a tool spindle of a machine tool equipped with the same, without requiring additional installation space for this measure or without needing to attach separate parts in the form of adapters on the spindle nose 1 or on the tool spindle.

LIST OF REFERENCE NUMBERS

1 Spindle nose
2 Conical receiving area
3 Wall
4 Contact edge
5 Flat contact surface
6 Receiving bore
7 Sensor
8 Sensing element
9 Blind bore
10 Full bridge circuit
I Segment
II Segment
III Segment
IV Segment
V Segment
VI Segment
VII Segment
VIII Segment
L Longitudinal direction (direction of the longitudinal axis)
R1-R4 Resistor
the direction of the longitudinal axis.

The invention claimed is:

1. A spindle nose for a tool spindle of a machine tool, wherein the spindle nose has:
   a longitudinal axis and a receiving end at which a conical receiving area opens, where the conical receiving area tapers conically away from the receiving end in the direction of the longitudinal axis and is adapted to receive a tool shaft cone therein;

wherein the conical receiving area is surrounded by a circumferential wall which forms a circumferential contact edge at the receiving end;

wherein the circumferential contact edge has flat contact surfaces on which contact surfaces of the tool shaft cone are adapted to rest when the tool is clamped in the tool spindle;

wherein the circumferential wall of the spindle nose defines receiving bores therein in the form of blind bores which lead perpendicularly to the flat contact surfaces and which end below the flat contact surfaces;

wherein the circumferential contact edge is divided into at least four segments with the same angle, and at least one receiving bore is formed in each of the at least four segments such that two receiving bores formed in the aforementioned manner lie diametrically opposite each other in each segment;

wherein a sensor is arranged in each of the receiving bores and is sensitive to forces and/or deformations in the direction of the extension of the associated receiving bore, and which changes a value of a measurement; and wherein an analyzing device is provided in which the sensors make a contribution with different mathematical signs in the event of the forces and/or the deformations acting in the direction of the longitudinal axis.

2. The spindle nose according to claim 1, wherein pairs of receiving bores lie diametrically opposite each other, and at least two sensors arranged in first segments of the at least four segments adjacent to each other make a contribution with a first mathematical sign, + or −;

wherein at least two sensors arranged in second segments of the at least four segments that are different from the first segments and lying adjacent to each other make a contribution with a second mathematical sign, − or +, opposite from the first mathematical sign.

3. The spindle nose according to claim 1, wherein the circumferential contact edge is divided into at least eight segments with the same angle, and at least one receiving bore is formed in each of the at least eight segments such that two receiving bores formed in the aforementioned manner lie diametrically opposite each other in pairs in each of the at least eight segments;

wherein the sensor arranged in each of the receiving bores and sensitive to the forces and/or the deformations in the direction of the extension of the receiving bore and which changes sensor's electrical resistance on the basis of such forces and/or deformations;

wherein the analyzing device is provided with four respective sensors that are electrically or logically connected together to a full bridge circuit such that sensors arranged in two respective receiving bores which lie diametrically opposite to each other in pairs of adjacent segments are connected in parallel loops of the full bridge circuit in such a manner that:

in a first loop of the full bridge circuit, a first sensor arranged in a first receiving bore and a third sensor arranged in a third receiving bore lying in a segment adjacent to the segment in which a second sensor is received in a second receiving bore which lies diametrically opposite from the first receiving bore are connected in series; and in a second loop of the full bridge circuit, parallel to the first sensor, a fourth sensor arranged in a fourth receiving bore lying diametrically opposite from the first receiving bore is connected in series with the second sensor.

4. The spindle nose according to claim 1, wherein the receiving bores extend in the direction of the longitudinal axis.

5. The spindle nose according to claim 1, wherein each of the receiving bores has a central axis; and wherein the receiving bores are arranged in such a manner that their central axes intersect with a circumferential line of a circle concentric with the longitudinal axis of the spindle nose.

6. The spindle nose according to claim 5, wherein the center axes of the receiving bores intersect the circumferential line at identical angular distances between the center axes of adjacent receiving bores.

7. The spindle nose according to claim 1, wherein the sensors are identical.

8. The spindle nose according to claim 1, wherein the sensors are cylinder-shaped strain sensors which detect-deformations in their axial direction.

9. The spindle nose according claim 1, wherein, in addition to the receiving bores, additional blind bores are positioned perpendicular to the flat contact surfaces, which reach the flat contact surfaces from a side opposite to the receiving end, wherein additional sensing elements are arranged in said additional blind bores, wherein the additional sensing elements are connected independently from the sensors and are configured to capture additional measurements.

10. The spindle nose according to claim 9, further comprising a transmitter for wirelessly transmitting measurement data captured by the sensors and by the applicable additionally sensing elements to a receiving unit arranged outside of the spindle nose.

11. The spindle nose according to claim 1, further comprising an energy supply module for supplying the sensors and applicable additional electric components arranged on the spindle nose via energy received by the energy supply module in a wireless manner.

12. The spindle nose according to claim 1, further comprising an energy storage device arranged on the spindle nose for storing electrical energy.

13. The spindle nose according to claim 1, wherein the receiving bores end 3-15 mm below the flat contact surfaces.

14. A tool spindle for a machine tool having a stator and a rotor, and having a spindle nose according to claim 1 arranged on a front end of the rotor.

15. The spindle nose according to claim 1, wherein the sensor is arranged in each of the receiving bores and is sensitive to forces and/or deformations in the direction of the extension of the associated receiving bore, and the sensors' electrical resistance changes on the basis of such forces and/or deformations.

16. The spindle nose according to claim 1, wherein the sensor in the analyzing device are arranged diametrically opposite from each other.

* * * * *